United States Patent [19]

Marshall

[11] 3,860,907

[45] Jan. 14, 1975

[54] DATA RESYNCHRONIZATION EMPLOYING A PLURALITY OF DECODERS

[75] Inventor: John W. Marshall, Boulder, Colo.

[73] Assignee: International Business Machines Corporation, Armonk, N.Y.

[22] Filed: June 21, 1973

[21] Appl. No.: 372,389

[52] U.S. Cl. .................... 340/146.1 D, 340/174 ED
[51] Int. Cl. .............................................. G06k 5/00
[58] Field of Search ............. 340/146.1 D, 174 ED, 340/174 DD, 174.1 B; 178/69.5 R; 179/15 AE, 15 BS

[56] References Cited

UNITED STATES PATENTS

| | | | |
|---|---|---|---|
| 3,507,998 | 4/1970 | Moeller | 340/146.1 D X |
| 3,689,899 | 9/1972 | Franaszek | 340/146.1 D X |
| 3,701,894 | 10/1972 | Low et al. | 340/146.1 D X |

*Primary Examiner*—Malcolm A. Morrison
*Assistant Examiner*—David H. Malzahn
*Attorney, Agent, or Firm*—Gunter A. Hauptman

[57] ABSTRACT

Electrical signals recorded on a magnetic medium as magnetic indicia represent digital data. Digits of data are recorded as encoded pairs of indicia (couples) by corresponding pair of signals. Successive encoded indicia are recorded on the medium serially in sequence; for example, in stripes oriented diagonally across magnetic tape. During reading, defects in the medium, or errors in data transfer, resulting in a loss of synchronization between encoded indicia and the digit represented, are compensated for. Encoded indicia are continuously compared with a resynchronization pattern dispersed throughout recorded data at regular intervals. When an error is detected, the encoded indicia are decoded and stored in two buffers, each storing sets of digits decoded from differently chosen indicia pairs. The contents of one of these buffers is thereafter utilized when a resynchronization pattern identifies the correct set of digits.

23 Claims, 11 Drawing Figures

ϕab DECODER 304

ϕ ba DECODER 305

DECISION GATES 315

DATA SEGMENT SG-1

DATA RESYNCHRONIZATION EMPLOYING A PLURALITY OF DECODERS

BACKGROUND OF THE INVENTION

1. Field of the Invention

Figure 1A:
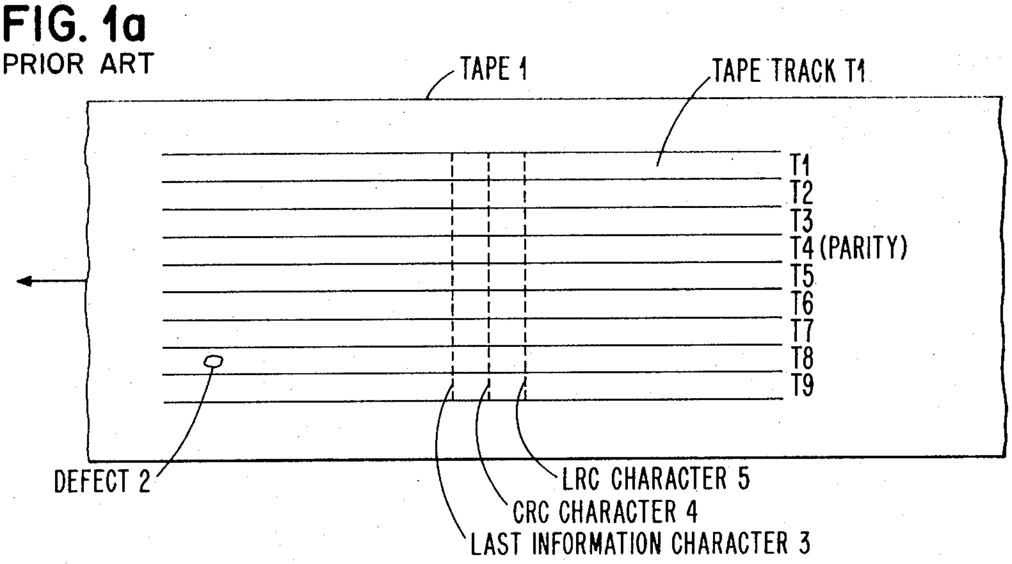
FIG. 1a PRIOR ART

This invention generally relates to electronic information processing and more particularly to error correction in a magnetic medium reading system.

2. Description of the Prior Art

Defects frequently occur in or on media used to store digital data. For example, a dirt particle may become imbedded in the surface of a magnetic tape, preventing the correct recording of digital information at that point. Other defects may occur during the manufacture of the medium, due to creasing of the medium during use, as a result of external scratching, heating, etc., or the effect of a defect may be simulated during data transfer.

The defect's effect can be more extensive than the mere failure to record digital data at the point of defect. Modern data retrieval systems, such as magnetic tape transports and control units of the type identified in the "Component Description-IBM 3803/3420 Magnetic Tape Subsystems," Form No. GA32-0020-0, published November, 1970, by the International Business Machines Corporation, Armonk, N.Y., provide a number of error detection and correction techniques intended to at least recognize and possibly compensate for the described defects. The "USA Standard Recorded Magnetic Tape for Information Interchange (800 CPI, NRZI)," USAS X3.22–1967, now published by the American National Standards Institute (ANSI), New York, N.Y., describes widely used redundancy checking techniques for identifying magnetic tape tracks in which an error caused, for example, by a tape defect has occurred. Once the occurrence of an error has been recognized, data from the effected track or tracks can either be ignored or corrected to prevent subsequent use of incorrect data. A typical defect will effect one or two magnetic tape tracks, which are then (in effect) removed from service for a period of time until possible indirect effects of the defect, such as the loss of timing synchronization, can be corrected. Thus, a small defect can prevent use of a much larger amount of following data. However, in the case of longitudinally recorded parallel tracks, this following data is not necessarily lost because conventional error correcting techniques are applicable to restore the data if not more than one or two tracks are effected.

Conventional error detection techniques using error check characters, specifically the cyclic redundancy check (CRC) character described in the ANSI Standard above, and connected correction techniques, require that the defect effect a limited number of tracks and, thus, a limited number of associated bits in the CRC character. Once this number is exceeded, detection is degraded and correction becomes impossible. For example, standard ½ inch magnetic tape with nine tracks has a nine bit CRC character following each block of data recorded on the tape. If a defect effects one track in the block, the CRC character will identify the track, permitting subsequent correction of all errors in the track. If two tracks are effected, the cyclic redundancy check will identify the occurrence of an error, but not the specific tracks causing the error, and subsequent correction will generally not be possible unless the tracks in error are determined by some other means. This will result in a known loss of data. If more than two tracks are effected, the cyclic redundancy check may even fail to identify the occurrence of the defect and incorrect data will subsequently be utilized. In any event, errors in more than two trakcs will generally not be correctable using the referenced techniques.

Studies of tape defects show that it is highly unlikely for a defect to effect more than one track on conventionally recorded ½-inch tape. However, the likelihood increases when the data recording density is increased by narrowing the tracks and reducing inter-track spacing, thus effectively decreasing track independence. Similarly, if data is formatted into a single serial sequence of data blocks, the independence of the different data blocks is decreased and the likelihood for a multiblock error is increased. Also, the likelihood of multi-track or multi-block errors for both recording schemes is substantially increased if the effective length of a given defect is increased (by packing the data closer together, for instance), due to a loss of data synchronization that persists after nominal detection has been restored. This problem is especially evident where data is formatted in multiple-digit subsequences ("*m*-tuples"), such as binary couples or pairs, used for modulation or error correction as described in "Data Coding with Stable Base Line for Recording and Transmitting Binary Data," by A. M. Patel, Ser. No. 317,980, filed Dec. 26, 1972, which is incorporated herein by this reference.

In one prior art method of applying serial recording techniques to digital systems, data is sequentially recorded in tracks (stripes) oriented diagonally across the medium. Diagonal stripes record data serially from one tape edge to the other and then in from the first edge again. Each stripe is divided into segments, sections, and blocks. For example, a segment may contain 15 sections and a section 16 blocks, each section being roughly analogous to a track in a longitudinal system. Studies have shown that small defects can result in errors that span more than one section. While special resynchronization characters are appended to each section to reestablish data timing (if lost due to defects), the effective length of a given error burst that spans more than one section is often increased due to synchronization losses within a section. If the ECC code is to be used optimally, these intrasectional synchronization losses must be prevented.

Since the effect of a small defect on such a system will often be analogous to a multi-track defect in a longitudinal system, conventional cyclic redundancy check error detection and correction schemes are generally alone inadequate to provide error control and must be appropriately modified. In a typical prior art modification of the basic cyclic redundancy check scheme, multi-block error correction code (ECC) words, interlaced into data blocks, are each derived from multiple blocks so that a sequential run of data blocks will contain no more than one block from each code word. Each multi-block ECC code word comprises a fixed data sequence followed by a data check sequence derived from the data sequence in accordance with well known error correction techniques. For the diagonal recording scheme, two check blocks, a simple parity block (error pattern indicator), and a cyclic redundancy check block (error displacement indicator), comprise each ECC. This ECC provides correction of all single block/code word errors and (with auxiliary pointers) can be extended to correct all double block/ code word errors.

Diagonal recording uses special techniques which introduce unique synchronization losses due to defects. Each binary digit to be recorded is actually encoded and written as a plurality of bits (for example, binary couples) to achieve high recording density despite signal coupling problems unique to diagonal recording, as described in the referenced A. M. Patel application. In the example, once binary couples are recorded on stripes, it is essential that reading progress with properly framed pairs of bits so that properly constituted couples (as opposed to bit pairs from separate couples) representative of recorded digits are read and decoded. Framing synchronization is normally retained by the use of a known data synchronization burst at the end of each data section. However, a typical defect will often obliterate at least one such burst so that even after detection is restored a loss of framing may occur and persist until resynchronization is achieved. The resulting errors may not be corrected or even detected by the ECC because its capabilities are exceeded and data lost.

SUMMARY OF THE INVENTION

These problems are overcome by the invention by continuously placing digits representing decoded bits read from the tape into two separate buffers. Each buffer stores sets of digits derived from sequentially read pairs of binary bits. One buffer pairs each bit with its adjacent left-hand bit and the other buffer pairs each bit with its adjacent right-hand bit. It is assumed that one of the buffers will contain properly framed binary couples representing the digits recorded on the tape whether or not an error has occurred. If there was an error, it may cause loss of framing. In such case, once the data synchronization burst character is reached and proper framing restored, the effect of the defect on the framing prior to that point is determined and the proper buffer gated to release the data digits (together with their ECC) derived from the properly framed binary couples. If there was no loss of framing, whichever buffer contains the properly framed couples will similarly release its digits.

The foregoing and other features and advantages of the invention will be apparent from the following more particular description of preferred embodiments of the invention, as illustrated in the accompanying drawings.

IN THE DRAWINGS

FIG. 1*a* shows the format of prior art longitudinal recording on magnetic tape.

Figure 1B:
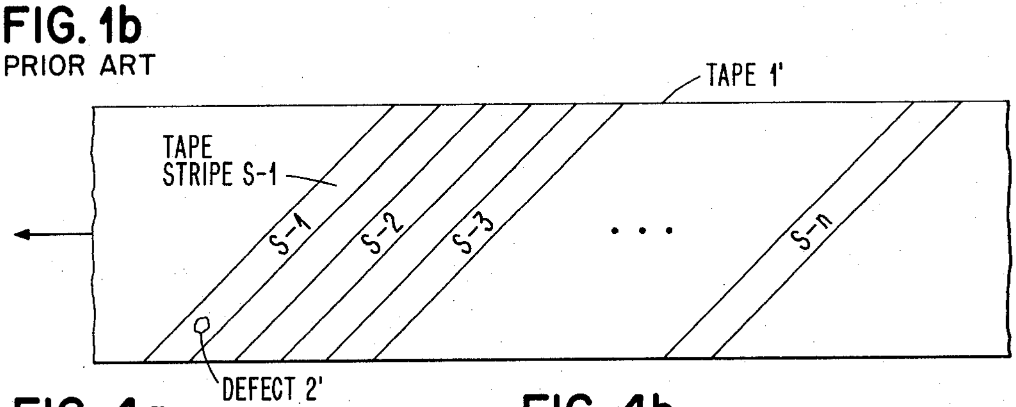
FIG. 1b PRIOR ART

FIG. 1*b* shows the format of prior art diagonal recording on magnetic tape.

Figure 2A:
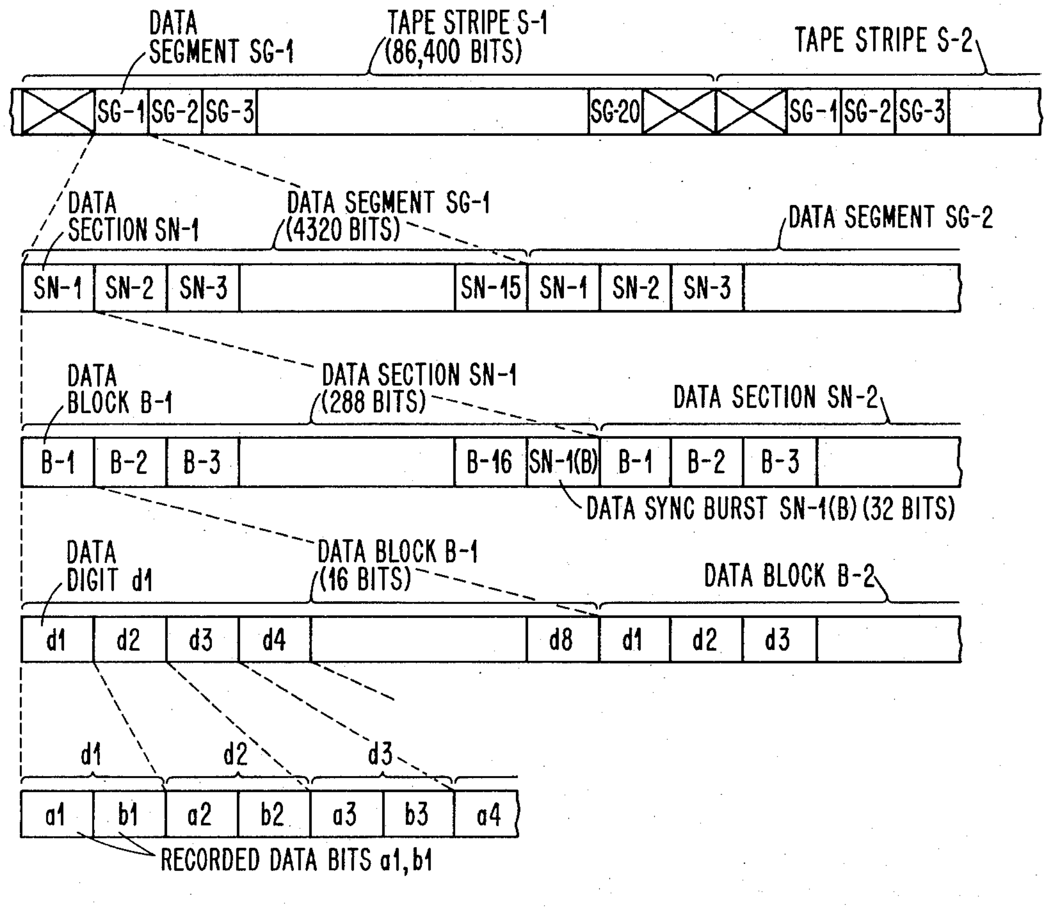

FIG. 2*a* illustrates in detail a bit configuration which may be used in the format shown in FIG. 1*b*.

Figure 2B:
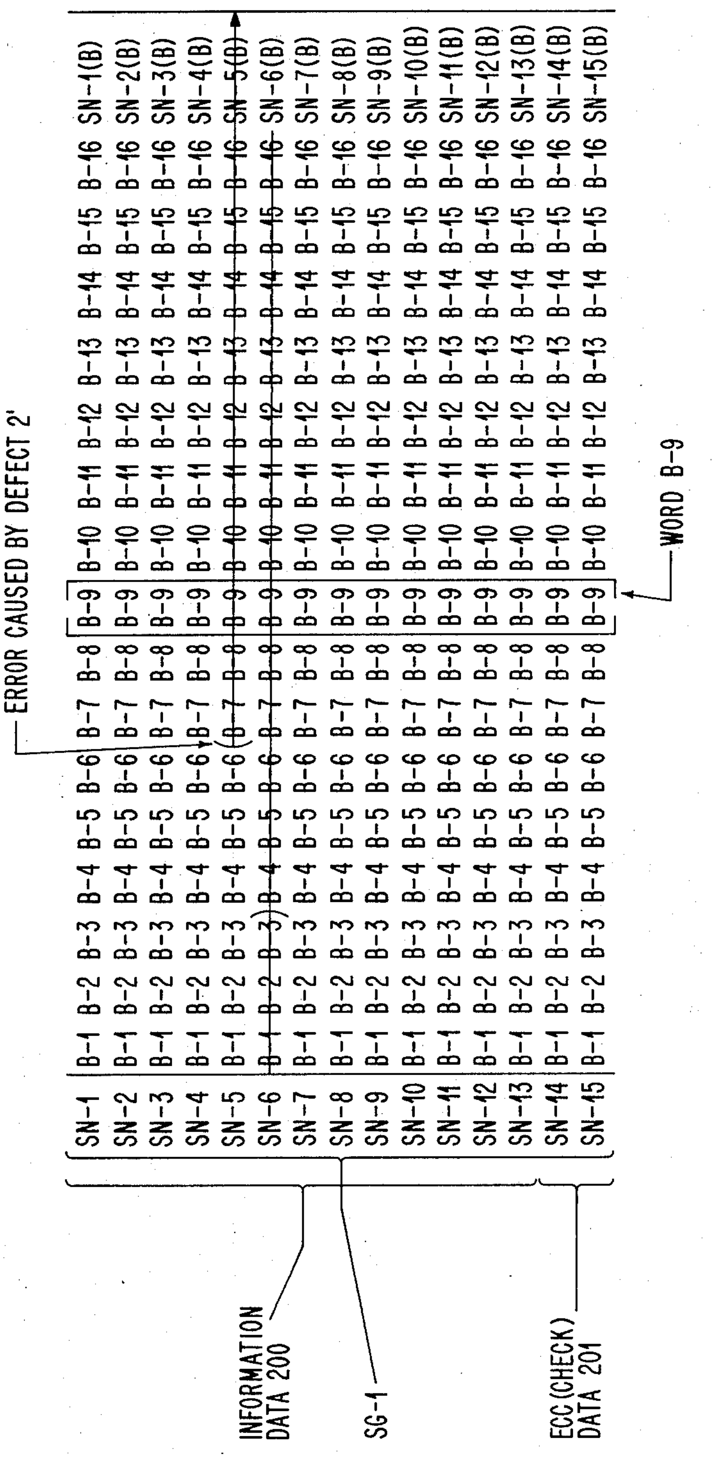

FIG. 2*b* is a table used to explain utilization of the bit configuration shown in FIG. 2*a*.

Figure 3:
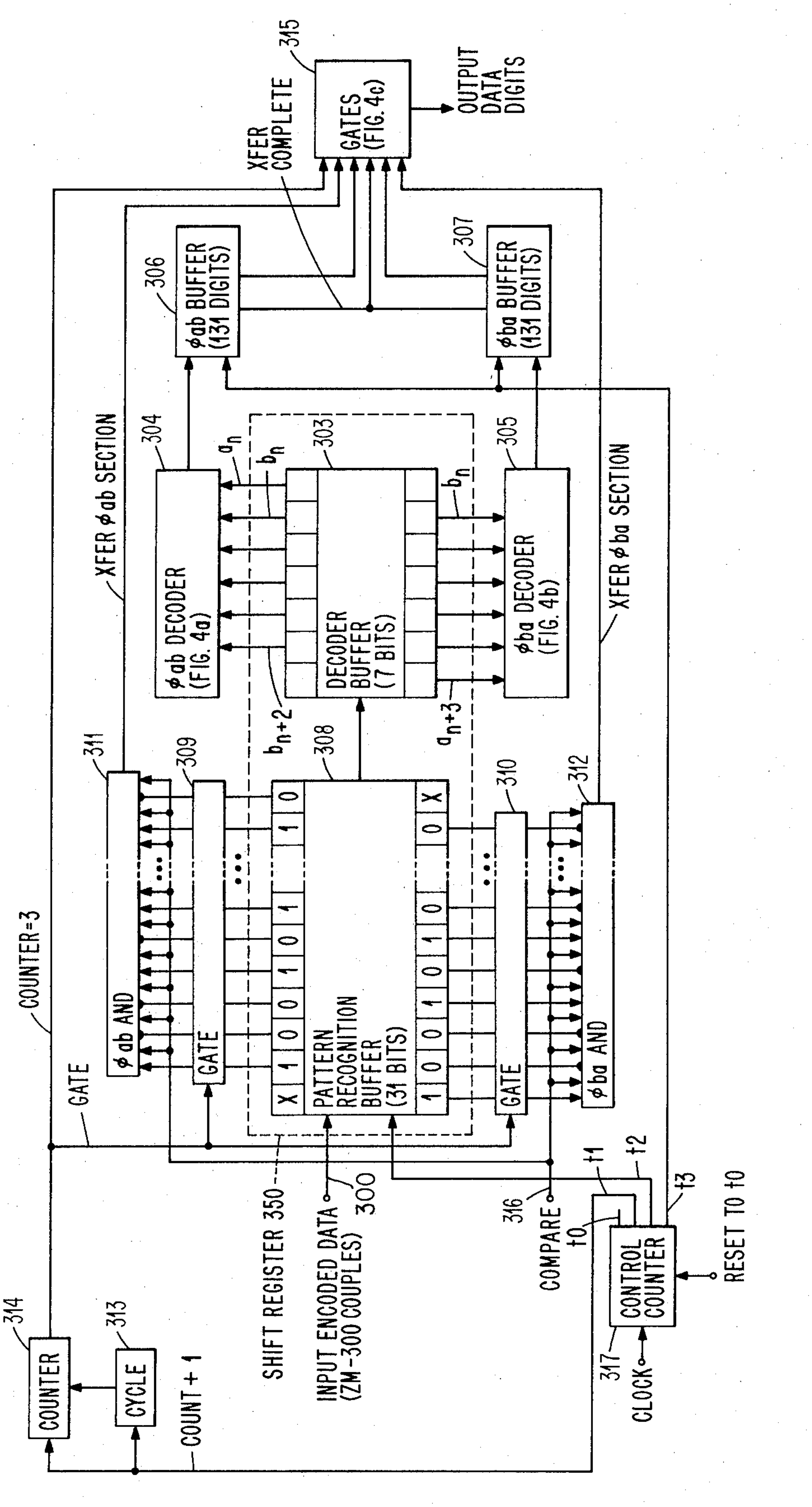

FIG. 3 is a logic diagram showing apparatus for resynchronizing data as a result of a defect.

Figure 4A:
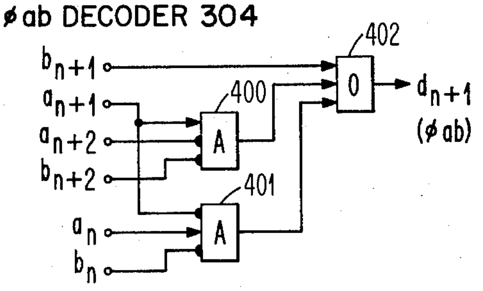

FIG. 4*a* is a logic diagram of the $\phi ab$ decoder 304 in FIG. 3.

Figure 4B:
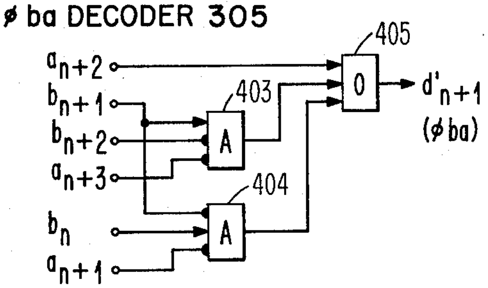

FIG. 4*b* is a logic diagram of the $\phi ba$ decoder 305 in FIG. 3.

Figure 4C:
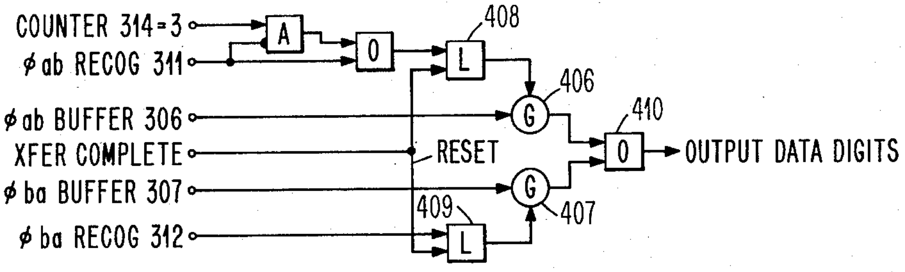

FIG. 4*c* is a logic diagram of the decision gates 315 in FIG. 3.

Figure 5A:
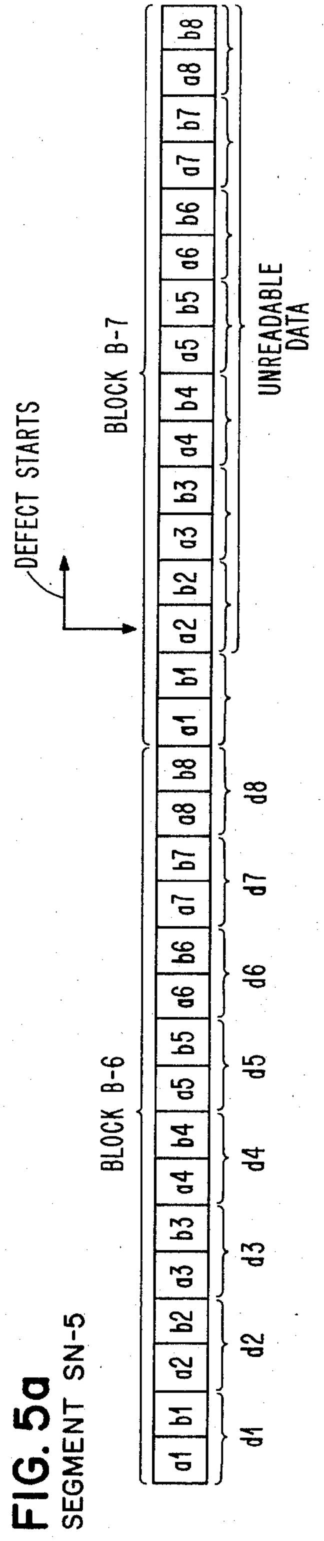
Figure 5B:
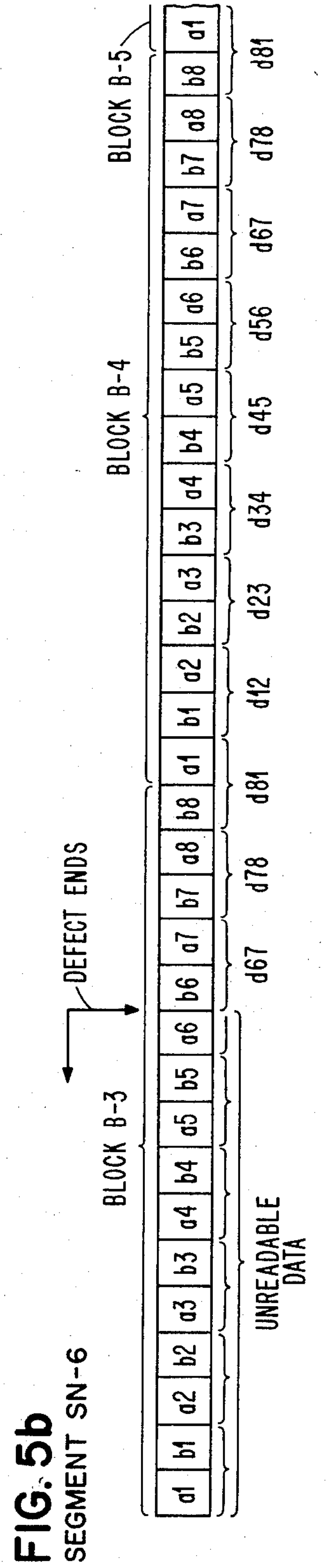
Figure 5C:
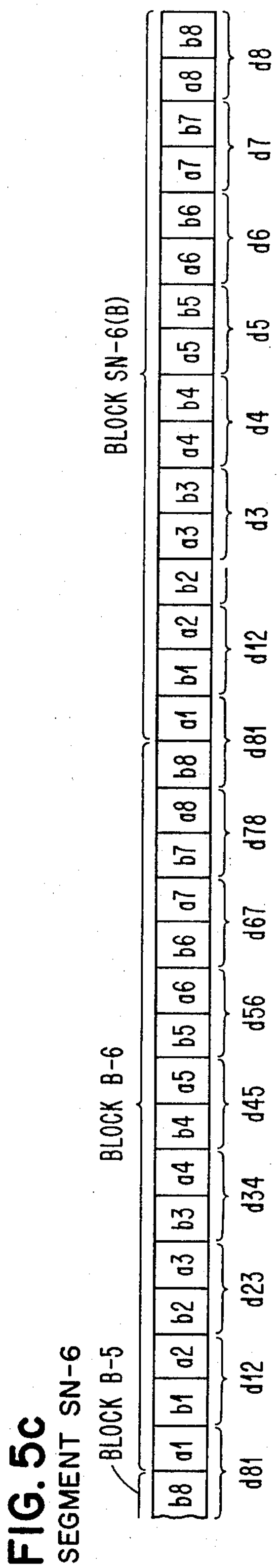

FIGS. 5*a*, 5*b*, and 5*c* are information format tables illustrating the operation of the invention.

GENERAL DESCRIPTION

Referring first to FIG. 1*a*, there is schematically shown a conventional magnetic tape 1 known as ½ inch nine-track magnetic recording tape. This tape consists of a base material of polyester film coated on one side with a flexible layer of ferromagnetic material dispersed in a suitable binder. Information or data represented as electrical signals is recorded on the magnetic tape by magnetizing discrete points on the tape along tracks T1 through T9. Specific data is represented as information characters grouped in blocks along the direction (indicated by an arrow) of movement of the tape. For illustration, the last information character 3 in a block is shown. Conventionally, the last information character 3 is followed by a cyclic redundancy check (CRC) character 4 and a longitudinal redundancy check (LRC) character 5. These characters 4 and 5 aid in the detection and correction of errors occurring during recording and reading of information onto and from the tape 1. For example, if a defect 2 occurs in track T8, the error will be detected by the CRC character and the information lost due to the defect can possibly be recovered through the use of the LRC character together with ordinary redundancy or parity information carried (in track T4) with every information character. Conventional techniques will detect an error effecting any one or two of tracks T1–T9 and will correct an error in any one track. Errors effecting more tracks either go undetected or uncorrected. The techniques for recording and utilizing the CRC and LRC characters, as well as the additional redundancy bits, are well known and are described, for instance, in the previously referenced ANSI Standard as well as in the following patents assigned to the International Business Machines Corporation: (1) U.S. Pat. No. 3,508,194, David T. Brown, "Error Detection and Correction System," (2) U.S. Pat. No. 3,508,195, Frederick F. Sellers, Jr., "Error Detection and Correction Means," and (3) U.S. Pat. No. 3,508,196, Frederick F. Sellers, Jr., and David T. Brown, "Error Detection and Correction Features."

In the prior art, there are also known schemes other than those requiring the recording of characters longitudinally along a tape as shown in FIG. 1*a*. For example, referring to FIG. 1*b*, it is well known to serially or sequentially record information diagonally across the direction of motion (shown by the arrow) of the tape 1'. While the information is continuously recorded across the tape in stripes S-1 through **S-*n***, it is evident from FIG. 1*b* that the stripes are discontinuous in that a stripe is recorded diagonally from top to bottom and then back again from the bottom. However, for the purposes of understanding the operation of such a recording technique, it may be assumed that the recording is continuous. Each character written across tracks T1–T9 in FIG. 1*a* is written as a series of manifestations along the stripes S-1, etc., in FIG. 1*b*.

The occurrence of a defect 2' on the tape 1' has a considerably different effect on information recorded on stripe S-1 than the corresponding defect 2 does on track T8 in FIG. 1*a*. The information in FIG. 1*a* that is lost due to the defect may be detected or corrected, or both, as long as no more than a maximum of tracks (for example, one or two) are effected. However, where information is sequentially recorded, the defect will effect a large number of data bits in the same character, initiating the effect of a multitrack defect in longitudinal recording.

The particular data format utilized in recording information on the tape 1' will be explained with reference to FIG. 2*a*. Eighty-six thousand four hundred bits are recorded on each tape stripe; for example, tape stripe S-1. The information in a tape stripe, such as tape stripe S-1, is divided into segments, sections, blocks, digits and bits. Each stripe is divided into 20 segments SG-1 through SG-20, each segment containing 4,320 bits. In turn, each segment is divided into 15 sections SN-1 through SN-15 of 288 bits each. Each section contains 17 blocks of which 16 (B-1 through B-16) are data blocks and the 17th block, SN-1(B), is a double-length data synchronization burst block. Each block contains 16 bits divided into 8 digits, *d*1 through *d*8, there being two bits to a digit. As explained in detail in the previously cross-referenced A. M. Patel application and to be explained below with respect to FIGS. 4*a* and 4*b*, data digits are represented, when recorded, by data bit pairs or couples. Thus, data digit *d*2 is a function of bits *a*1, *b*1, *a*2, *b*2, *a*3, and *b*3.

Referring now to FIG. 2*b*, the segment SG-1 in FIG. 2*a* has been rearranged so that the 15 sections SN-1 through SN-15 comprising the segment and their constituent blocks B-1 through B-16 are aligned beneath each other as shown. The double-length synchronization burst blocks SN-1(B) through SN-15(B) are also shown at their assigned positions. The data segment SG-1, as are all the data segments, is divided into 16 code words; for example, word B-9 is shown by brackets. Each word is divided into an information data portion 200 and an error correcting code (ECC) check data portion 201. The effect of the defect 2' is shown by lines and parentheses. The defect 2' physically spans the parenthesized portions of sections SN-5 and SN-6. In addition, as shown by the lines, the defect causes the loss of data spanning even a greater portion of section SN-6 because, as will be explained, each block's meaning as data is determined by coupled pairs of sequential bits in FIG. 2*a*. If normally non-coupled pairs of bits are erroneously interpreted as pairs, incorrect data results. The synchronization burst characters are used to maintain appropriate synchronization between sequential bits read and their appropriate coupling. When a synchronization burst character such as SN-5(B) is lost due to a defect, incorrect synchronization may result in erroneous data. Here, the synchronization burst character SN-5(B), obliterated by the defect, would normally permit the reestablishment of data detection. However, due to the loss of SN-5(B), all data in blocks B-1 through B-16 preceding the next synchronization burst SN-6(B) is also lost. While the ECC generated error check characters 201 may be provided as part of any words (for example, B-9), these do not aid in the detection or correction of the errors introduced by the defect 2' because errors effecting more than two information data positions cannot be corrected if a conventional ECC is used. Since defect 2' effects two positions in all words following word B-7, a conventional ECC will not thereafter be operative. Also, in line SN-6, it will be noted that blocks B-4 through B-6 should be recreatable with appropriate ECC techniques, but will, nevertheless, be erroneously read for the reason that all words B-4 through B-16 following the end of the defect may contain data digits incorrectly interpreted from the data bits recorded because resynchronization character SN-5(B) was lost.

Theoretical Description

The problem and the solution to the problem may be theoretically and rigorously stated in the following terms: Many non-linear encoding (digital modulation) schemes map a length $n$, $n \geq 1$, ordered sequence of data characters into a length $m$, $m \geq 2$, ordered sequence of channel characters before use in a transmission device. Typical examples are zero modulation (see the cross-referenced A. M. Patel application) where each data bit is mapped into a binary couple, $d \rightarrow (a_n b_n)$, or non-linear pseudo-ternary where each binary data quadruple is mapped into a ternary triple, $(d_1 d_2 d_3 d_4)_i \rightarrow (a_i b_i c_i)$ (Introduction to Pseudo-Ternary Codes, A. Croisier, IBM Journal of Research and Development, May, 1970). After use, decoding the detected waveforms typically involves evaluation of a function defined on one or more of the encoded $m$-tuples. As long as the decoder is properly synchronized with respect to the sequences of $m$-tuples, errors resulting from misdetected characters are limited by the effective memory length of the decoding function. However, if one or more characters from the sequence of $m$-tuples should be lost, or should the detection clock, used to synchronize the received signals with the receiving circuit, slip in phase by one or more character cycles, the decoder could lose the phase reference necessary to properly define the $m$-tuples for decoding. Thus, once the phase reference is lost, the resulting error would be propagated until the decoder was reset by a received resynchronization character having a known signal pattern. A method for preventing this type of error propagation may be illustrated using zero modulation (ZM) as an example, where the decoded digit is the data digit corresponding to the $n$+1) ZM couple, i.e., $(d_{ab})_{n+1}$ or $(d_{ba})_{n+1}$. The decoding function (see also FIG. 4*a*) is defined on the sequence of three ZM couples $$[(a_n, b_n), (a_{n+1}, b_{n+1}), (a_{n+2}, b_{n+2})]_{by}$$

$$d_{ab} = b_{n+1} + a_{n+1}\overline{a}_{n+2}\overline{b}_{n+2} + \overline{a}_{n+1}a_n\overline{b}_n$$

where $d_{ab}$ is the $i$-th data bit and $d_{ba}$ would be the right-hand adjacent $i$+1-th data bit. Symbolically, the decoding function could be represented as:

$$d_{ab} = F[(a_n, b_n), (a_{n+1}, b_{n+1}), (a_{n+2}, b_{n+}, b_{n+2})].$$

Should a single ZM bit be lost or the detector clock slip by one ZM bit cycle (e.g., during a drop-out accompanied by a velocity variation), the decoding function would then be erroneously defined on the sequence of ZM couples $[(b_n, a_{n+1}), (b_{n+1}, a_{n+2}), (b_{n+2}, a_{n+3})]$, i.e., $d_{ab} = a_{n+2} + b_{n+1}\overline{b}_{n+2}\overline{a}_{n+3} + \overline{b}_{n+1}b_n\overline{a}_{n+1}$. Furthermore, since the phase reference of the decoder cannot be reset until a resynchronization character has been detected in the sequence of ZM digits, all subsequent data would also be incorrectly decoded until the reset was effected. This error propagation due to a lost phase reference can be prevented by using two decoders operating in parallel with a relative phase lag of one ZM bit cycle. The output of both decoders would be buffered until a resync character was encountered and the correctly decoded data would then be taken from the buffer corresponding to a "proper phase" of the resync character with respect to the clock and the ZM decoding function. For example, if the resync character were the sequence . . . 00101000101 . . . , the correctly decoded buffer would be that for which the ZM sequence was mapped into the couples (0,0), (1,0), (1,0), (0,0) (0,1), (0,1) for decoding. The alternate mapping (.,0), (0,1), (0,1), etc., would be out of phase by one ZM bit and would correspond to the incorrect buffer.

Extension of the approach to other nonlinear mappings is possible. For example, in a 4 to 3 pseudo-ternary scheme, the decoder would be defined with respect to the sequence of encoded ternary triples $(a_ib_ic_i)$. To allow for all possible phase shift errors, three decoders would be used with each decoder lagging the preceding decoder by one pseudo-ternary digit cycle. The buffer containing the correctly decoded data would again be that buffer associated with the decoder that recognized the resync character as being in phase with its own phase reference.

Detailed Structural Description

Referring now to FIG. 3, encoded input data from, for example, magnetic media is entered on line 300 and serially shifted into a 38-bit shift register 350. Shift register 350 may be considered as being functionally separated into two shift registers, a 31-bit pattern recognition buffer 308 and a seven-bit decoder buffer 303. During each shift cycle, initiated by a signal from a control counter 317, the contents of the buffer 308 are staticized and gated in parallel through the gates 309 and 310 into pattern recognition logic blocks 311 and 312 and then shifted right +2. Blocks 311 and 312 AND the contents of the buffer 308 with a fixed predetermined resynchronization pattern indicated by inhibit inputs. The compare lines are normally all ones, but alternatively, the inhibit inputs may be removed from the blocks 311 and 312 and the pattern instead supplied on the compare lines 316. This determines whether the last encoded data that has been shifted into the decoder buffer 303 is to be interpreted as a "phase *ab*" ($\phi ab$) or a "phase *ba*" ($\phi ba$ ) sequence. In normal operation, decoding of data by decoder 304 and 305 is terminated by the recognition of a resynchronization pattern or by the completion of 131 shift cycles counted by a counter 314, whichever event occurs first. Since a single two-bit data digit is decoded during each shift cycle, the 131 shift cycles allow for up to three additional decode cycles per 256-bit section (288 bits less 32 data synchronization bits) to compensate for possible "clock slippage" during extended signal loss or dropout conditions. Prior to the completion of 131 recognition/decode cycles, the failure to recognize a resynchronization pattern during any given cycle is interpreted as indicating that the buffer 308 contains yet undecoded data, and the buffer is subsequently shifted right +2 to initiate another recognition/decode cycle. This moves all data digit bit couples in the buffer 308 to the right two positions with the left-most couple being replaced by a new couple from line 300. The right-most couple is shifted directly into the decoder buffer 303.

The seven-bit decoder buffer 303 portion of the shift register 350 has six lines going to a six-bit $\phi ab$ decoder 304 and six lines going to a six-bit $\phi ba$ decoder 305. The lines are offset by one bit so that the decoder 304 supplies at its output to a $\phi ab$ buffer 306 data digits (as decoded from a $\phi ab$ sequence) while the decoder 305 supplies a $\phi ba$ buffer 307 data digits (as decoded from a $\phi ba$ sequence). The decoder buffer 303 is shifted right +2 at time *t2* after each digit is decoded by the decoders 304 and 305. At this time, one of $\phi ab$ and $\phi ba$ buffers 306 and 307 receives the decoded digits from the corresponding one of the decoders 304 and 305 and it, in turn at time *t3*, is shifted right one to make room for the next digit. In this way, up to 131 decoded digits may be stored in each one of the buffers 306 and 307, each representing a different decoding of the same decoder buffer 303 contents. Normally, as stated above, only 128 data digits per section will be decoded before sensing a resynchronization character.

Each section of data, referring again to FIG. 2*b*, ends in a synchronization burst (SN-7(B), for example). In FIG. 3, the occurrence of this synchronization burst is anticipated by a 125-bit cycle counter 313 which steps +1 at time *t1* and resets and initiates stepping of another counter 314 when the 125th count is reached. Counter 314 counts from −3 to +3 to frame the period during which the occurrence of the synchronization burst is expected. This allows the end of the data section, as referenced from the resynchronization burst, to differ from the nominal end, as referenced from an external system clock, by as much as ±3 cycles due to possible clock slippage during dropout conditions. The output from the counter 314 operates gates 309 and 310 to compare the current contents of the shift register 308 with the predetermined synchronization burst pattern. For example, two patterns illustrated in the pattern recognition buffer 308 are implemented by inverter (inhibit) inputs supplied to the AND circuits 311 and 312. Alternatively, the inverters could be omitted and the patterns supplied on the compare lines 316. A typical pattern is "X100101 . . . 10," where "X" means that either a 1 or 0 will satisfy the logic. The upper pattern "100101 . . . 0X" is the same pattern offset by one bit. When the synchronization burst occurs, there will be an output from either the AND circuit 311 or the AND circuit 312, depending upon which correctly corresponds to the detected synchronization burst. The output from one of the AND circuits 311 or 312 then goes to a gate 315 to release the contents of a corresponding one of the buffers 306 and 307. Recognition of the resynchronization burst with respect to a count of 0 or $\pm n$ (where $n \leq 3$), in counter 314 allows the contents of the released buffer 306 or 307 to be properly right justified, i.e., shifted right or left *n* positions, before release.

The operation of the logic of the apparatus just described is controlled by a counter 317 operated by an external clock signal which causes signals to occur on lines ***t*1, *t*2, and *t*3 in sequence to supply the necessary counting and shifting pulses. The counter may be reset to start at time *t*0.**

Referring now to FIGS. **4*a* and 4*b*, the decoders 34 and 35 will be described. The output of an OR circuit 402 represents a $\phi ab$ data digit resulting from the examination of bits indicated at the inputs of the AND circuits 400, 401 and the OR circuit 402 where complemented bits are indicated by inhibit inputs. It can be seen that each data digit is the function of three different pairs of input bits. For example, if $n$=2, digit pairs $a_2b_2$, $a_3b_3$ and $a_4b_4$ generate a digit in a first phase $\phi ab$. Similarly, FIG. 4*b* illustrates the generation of a digit by OR circuit 405 based upon examination of all binary bits offset by one from those examined by the decoder 34.** Thus, where $n$=2, a digit in phase $\phi ba$ is based on $b_3a_4$, $b_4a_5$, $b_5a_6$.

The decision gates 315 will be explained with reference to FIG. **4*c*. The contents of the buffers 306 and 307 are gated through gates 406 and 407 respectively upon the occurrence of an appropriate recognition signal from the AND circuits 311 and 312. The recognition signals set a latch 408 or 409 which holds the gate 406 or 407 open for the transfer of data from buffer 306 or 307 to the output via an OR circuit 410. The latches 408 and 409 are normally set by pulse signals supplied by a signal counter =3 from counter 314** indicating that (*a*) no resynchronization burst was recognized after decoding 131 data digits, or (b) a $\phi ab$ resynchronization recognition, or (c) a $\phi ba$ resynchronization recognition. The latches are reset by a transfer complete signal after the proper buffer has been released. The first 128 data bits of the $\phi ab$ buffer are released for a no compare (counter 314=3) termination. It is also assumed that a $\phi ba$ recognition during the 131st cycle will take precedence over a counter 314=3 condition.

Example of Operation

The operation of the invention will now be described with reference to an example shown in FIGS. 5*a*, 5*b*, and 5*c*. FIGS. 5*a* through 5*c* show portions of segments SN-5 and SN-6 effected by a defect 2' on the tape 1'. The defect starts in block B-7 of section SN-5 and continues through block B-3 of the next section, SN-6. Initially data digits *d*1 through *d*8 are each correctly decoded as a function of bit pairs *a*1, *b*1, etc. The data which is recorded on the tape at the point of the defect is totally unreadable. This results in a temporary loss of clock-to-encoded data referencing, causing an assumed "advance" of the clock by the equivalent of one ZM bit before termination of the defect. Upon the termination of the defect, digit *d*67 comprises a bit pair or binary couple of adjacent recorded bits from two different couples; that is, the "*b6*" bit from the *a6b6* couple and the "*a7*" bit from the *a7b7* couple (the other related couples are *b5a6* and *b7a8*). This lack of synchronization continues through subsequent blocks until block SN-6B is reached. Obviously, the digits read up to this point are incorrectly interpreted. As this information is entered into the shift register 350, the decoder 304 stores in the buffer 306 digits in a phase $\phi ab$ as shown in FIGS. 5*b* and 5*c*, that is, it stores the incorrectly interpreted digits *d*67, *d*78, etc. The decoder 305 stores in the buffer 307 the digits in phase $\phi ba$ which are interpreted by examining the pairs of bits moved one position to the right from that shown in FIGS. 5*b* and 5*c*, that is, the digits *a*7 and *b*7 to generate a digit 77, etc. It can be seen that this digit is a correct interpretation of the binary bits and that subsequent digits are also correct. When block SN-6B is reached, the pattern recognition buffer 308 pattern matches the predetermined pattern "100101 . . . 0X" at the $\phi ba$ AND circuit 312 which causes the gate 315 to transfer the contents of the buffer 307 to the output 301. Thus, the correctly interpreted digital data is utilized.

While the invention has been particularly shown and described with reference to preferred embodiments thereof, it will be understood by those skilled in the art that various changes in form and details may be made therein without departing from the spirit and scope of the invention.

What is claimed is:

1. In a data subsystem for handling serial sequences of data representative digits, wherein the digits are serially recorded, effectively continuously along physically discontinuous diagonal stripes on an elongated medium, as pairs of adjacent magnetic manifestations corresponding to pairs of electric recording signals, coded to represent the digits in accordance with a predetermined relationship, the recorded digits being sensed by decoding pairs of electric read signals, each pair relating to a single pair of corresponding magnetic manifestations, in accordance with the predetermined relationship; apparatus effective when electric read signal pairs erroneously relate to noncorresponding magnetic manifestations, comprising:

a shift register having one input for receiving electric read signal pairs in sequence, another input operable to shift the signals in one direction one pair at a time, and a plurality of outputs for supplying the received signals in parallel;

a first and second decoder each having inputs, connected to different sets of the shift register outputs, and outputs for supplying digits derived in accordance with the predetermined relationship as a function of the electric read signal pairs at that decoder's inputs;

a first and second memory buffer each having inputs connected to outputs of corresponding ones of the first and second decoders for storing a plurality of digits; and first and second recognition circuits each having inputs connected to the shift register for receiving electric read signals and outputs supplying signals for selecting for accessing one of said first and second buffers in accordance with the occurrence of digit patterns in the shift register.

2. In a data processing system for retrieving digital data recorded as magnetic indicia on a magnetic media, wherein groups of signals representing groups of magnetic indicia are encoded from corresponding digits of data and the signals periodically include a known predetermined pattern; a combination for maintaining the correspondence of groups and digits despite the temporary failure, during retrieval, to properly receive all the signals, comprising:

a first decoder, having an input and an output, for supplying at the output first digits of data derived from first signal sets representing magnetic indicia received at the input;

a second decoder, having an input and an output, for supplying at the output second digits of data, derived from second signal sets representing magnetic indicia received at the input;

first and second storage means, each having an input and an output, the inputs being connected to outputs of corresponding ones of the first and second decoders, for storing digits of data received therefrom;

recognition means, having an input and an output, for indicating as a signal at the output the presence at the input of said known predetermined pattern of digits in alignment with specified ones of the first and second signal sets; and gating means connected to said first and second storage means and to said recognition means for transferring to an output the digits of data stored in a selected one of said storage means in response to the signals at the output of said recognition means.

3. In combination:

a source of multi-valued sequential signals, the values of sets of signals representing different digital quantities, and the signals including a periodically occurring predetermined sequence of signals;

a first comparator, having an input connected to the source and an output, for comparing with a predetermined signal sequence a first plurality of sequential signals supplied by the source, and supplying a recognition signal at said output indicative of the reception at the input of said predetermined sequence of signals;

a second comparator, having an input connected to the source and an output for comparing with the predetermined signal sequence a second plurality of sequential signals supplied by the source and supplying a recognition signal at said output indicative of the reception at the input of said predetermined sequence of signals;

decoding means, having an input connected to the source and a plurality of outputs, for supplying at the outputs signals representing digital quantities derived from a number of different groupings of signals sequentially received at the input;

a plurality of buffers equal to the number of comparator outputs each having an input and an output, each input being connected to a different decoding means output and operable to receive for retention in its associated buffer signals representing digital values; and a gating circuit, connected to the comparator and buffer outputs for accessing those signals representing digital values retained in that buffer which corresponds to the comparator output supplying a recognition signal.

4. The combination of claim 3 wherein the second plurality of sequential signals differs from the first plurality by one signal.

5. In a system wherein data digits, initially encoded into signal sets in a sequence of multivalued signals, are received at an input and decoded as data digits; apparatus for correlating the selection of sets of the signals received at the input with the corresponding signal sets as initially encoded, comprising:

first decoding means, connected to the input via intervening means, for generating a first series of data digits as a function of a succession of selected adjacent first sets of the signals received at the input;

second decoding means, connected to the input via intervening means, for generating a second series of data digits as a function of a succession of selected adjacent second sets of the signals received at the input;

first and second accessible storage means, connected with respective ones of the first and second decoding means, for storing data digits generated by the corresponding decoding means;

selection means, connected to the input, operable in accordance with a predetermined portion of the sequence of signals received at the input to generate selection signals used for accessing one of the storage means; and output means, connected with the storage means and the selection means, for transferring to an output, in accordance with the selection signals, data digits from the storage means selected by the selection means.

6. The apparatus of claim 5 wherein:

the sequence of signals received at the input includes synchronism portions, each portion comprising a succession of predetermined signal values.

7. The apparatus of claim 5 wherein:

the second sets of selected adjacent signals received at the input are offset from the first sets by one signal.

8. The apparatus of claim 7 wherein:

the sequence of signals received at the input includes synchronism portions, each portion comprising a succession of predetermined signal values.

9. The apparatus of claim 8 wherein:

the selection means generates a first selection signal when the synchronism portion of the sequence of signals received at the input is identified with the first sets of the received signals and generates a second selection signal when the synchronism portion is identified with the second sets.

10. Apparatus for correlating the selection of groups of the signals received at an input with the corresponding signal groups as initially encoded, comprising:

decoding means, connected to the input through intervening means, for generating a plurality of series of data digits as a function of a succession of a plurality of selected adjacent sets of the signals received at the input;

means; plurality of storage means, connected with the decoding means, each for storing one series of the plurality of series of data digits generated by the decoding mans;

selection means, connected to the input, operable in accordance with a predetermined portion of the sequence of signals received at the input to generate selection signals used for accessing one of the plurality of storage means; and output means, connected with the storage means and the selection means, for transferring to an output, in accordance with the selection signals, data digits from the storage means selected by the selection means.

11. In a data processing system including:

A. a source of sequential electric signals, adjacent multiples of which signals represent digital values originally supplied to the source in accordance with a preassigned code, including a periodic sequence of predetermined signals representing a synchronization pattern;

B. more than one utilization means, connected to the source, each interpreting successive multiples of signals received from the source as unique digit values in accordance with the preassigned code and without regard to external perturbations which might cause the signal multiples received by the utilization means to differ from those originally supplied to the source; and C. means for compensating for interpretation errors introduced by the perturbations, including:

1. memory units, one connected to each utilization means, each unit storing a plurality of manifestations of the digital values, represented by different adjacent multiples of signals received from the source by the connected utilization means, and operable to release stored manifestations; and
2. recognition means, having one input connected to the source and a different output connected to each memory unit, for monitoring the signals received from the source and identifying the occurrence of a synchronization pattern by placing a signal on one output, to operate the connected memory to release stored manifestations, as a function of the difference between the adjacent multiples originally supplied to the source and those received therefrom.

12. In a data processing system for retrieving digital data recorded as magnetic indicia on a magnetic media, wherein signal couples representing magnetic indicia are encoded from corresponding digits of data and the signals periodically include a known predetermined pattern; a combination for maintaining the correspondence of couples and digits despite the temporary failure, during retrieval, to properly receive all the signals, comprising:

a first and second decoder, each having an input and an output, for supplying at each output first digits of data derived from respective first and second signal pairs representing magnetic indicia received at the corresponding input;

first and second storage means, each having an input and an output, the inputs being connected to outputs of corresponding ones of the first and second decoders, for storing digits of data received therefrom;

recognition means, having an input and an output, for indicating as a signal at the output the presence at the input of said known predetermined pattern of digits in alignment with specified ones of the first and second signal pairs; and gating means connected to said first and second storage means and to said recognition means for transferring to an output the digits of data stored in a selected one of said storage means in response to the signals at the output of said recognition means.

13. In combination:

a source of sequential binary signals, the binary values of pairs of signals representing different digital quantities, and the signals including a periodically occurring predetermined sequence of synchronization signals;

a first comparator, having an input connected to the source and an output, for comparing with a representation of the synchronization signals a first plurality of sequential signals supplied by the source, and supplying a recognition signal at said output indicative of the reception at the input of said synchronization signals;

a second comparator, having an input connected to the source and an output for comparing with a representation of the synchronization signals a second plurality of sequential signals supplied by the source and supplying a recognition signal at said output indicative of the reception at the input of said predetermined sequence of signals;

decoding means, having an input connected to the source and first and second outputs, for supplying at the outputs signals representing digital quantities derived from different pairs of signals sequentially received at the input;

a plurality of buffers equal to the number of comparator outputs each having an input and an output, each input being connected to a different decoding means output and operable to receive for retention in its associated buffer signals representing digital values; and a gating circuit, connected to the comparator and buffer outputs for accessing those signals representing digital values retained in that buffer which corresponds to the comparator output supplying a recognition signal.

14. The combination of claim 13 wherein the second plurality of synchronization signals differs from the first plurality by one signal.

15. In a system wherein data digits, initially encoded into couples in a sequence of binary signals including a predetermined synchronism sequence, are received at an input and decoded as data digits; apparatus for correlating the selection of couples received at the input with the corresponding couples initially encoded, comprising:

first decoding means, indirectly connected with the input, for generating a first series of data digits as a function of a succession of selected adjacent first pairs of signals received at the input;

second decoding means, indirectly connected with the input, for generating a second series of data digits as a function of a succession of selected adjacent second pairs of signals received at the input, each second pair being offset from the first pair by one signal;

first and second accessible storage means, connected to respective ones of the first and second decoding means, for storing data digits generated by the corresponding decoding means;

selection means, connected with the input, operable in accordance with the predetermined synchronism sequence received at the input to generate selection signals usable for accessing one of the storage means; and output means, connected with the storage means and the selection means, for transferring to a utilization device, in accordance with the selection signals, data digits from the storage means selected by the selection means.

16. The apparatus of claim 15 wherein:

the selection means generates a first selection signal when the synchronism portion of the sequence of signals received at the input is identified with the first sets of the received signals and generates a second selection signal when the synchronism portion is identified with the second sets.

17. In a data processing system, including:

a source of sequential electric signals, adjacent couples of which signals represent digital values originally supplied to the source in accordance with a preassigned code, said signals including a periodic sequence of predetermined synchronization signals;

a plurality of utilization means, connected to the source, each for interpreting successive couples of signals received from the source as unique digit values in accordance with the preassigned code and without regard to external perturbations which might cause the signal multiples received by the utilization means to differ from those originally supplied to the source;

memory units connected to the utilization means, each unit storing a plurality of manifestations of the digital values from a corresponding utilization means, and operable to release stored manifestations; and recognition means, having one input connected to the source and a different output connected to each memory unit, for monitoring the signals received from the source and identifying the occurrence of a synchronization pattern by placing a signal on one output, to operate the connected memory to release stored manifestations, as a function of the difference between the adjacent couples originally supplied to the source and those received therefrom.

18. In a system wherein data digits, initially encoded into signal sets in a sequence of multi-valued signals, are received at an input and decoded as data digits; a method for correlating the selection of sets of the signals received at the input with the corresponding signal sets as initially encoded, comprising the steps of:

generating a first series of data digits as a function of a succession of selected adjacent first sets of the signals received at the input;

generating a second series of data digits as a function of a succession of selected adjacent second sets of the signals received at the input;

storing generated data digits;

generating selection signals for accessing one of the series of data digits in accordance with a predetermined portion of the sequence of signals received at the input; and accessing, in accordance with the selection signals, the selected data digits.

19. In a system wherein data digits, initially encoded into couples in a sequence of binary signals including a predetermined synchronism sequence, are received at an input and decoded as data digits; a method for correlating the selection of couples received at the input with the corresponding couples initially encoded, comprising the steps of:

1. generating a first series of data digits as a function of a succession of selected adjacent first pairs of signals received at the input;
2. generating a second series of data digits as a function of a succession of selected adjacent second pairs of signals received at the input, each second pair being offset from the first pair by one signal;
3. storing generated data digits;
4. generating selection signals for accessing one of the series of data digits in accordance with the predetermined synchronism sequence received at the input; and
5. accessing, in accordance with the selection signals, the selected data digits.

20. The method of claim 19 wherein step (4) is further defined as:

generating a first selection signal, when the synchronism portion of the sequence of signals received at the input is identified with the first sets of the received signals, and generating a second selection signal when the synchronism portion is identified with the second sets.

21. A method for correlating the selection of groups of the signals received at an input with the corresponding signal groups as initially encoded, comprising the steps of:

generating a plurality of series of data digits as a function of a succession of a plurality of selected adjacent sets of the signals received at the input;

storing each series of the plurality of series of data digits generated;

generating selection signals for accessing one of the plurality of series of stored data digits in accordance with a predetermined portion of the sequence of signals; and accessing, in accordance with the selection signals, the selected data digits.

22. In a system transmitting and receiving a series of data signals with interleaved synchronization signals, apparatus for resynchronizing the phase of signals received prior to the loss of synchronism, comprising:

data decoding means, having inputs and a plurality of outputs, for supplying to the plurality of outputs data decoded as a plurality of functions of the data received at the inputs;

a plurality of stores, each having an input, connected to a corresponding decoding means output, and an output, each store operable to store decoded data supplied at one of the decoding means outputs;

synchronization recognition means, having inputs and a plurality of outputs, for recognizing synchronization signals received at the inputs and supplying to separate ones of the outputs an indication of the synchronization phase; and means connected to the stores and the synchronization recognition means for accessing via the output of the one of the stores, corresponding to the synchronized recognition means output having a phase indication, the decoded data therein.

23. In combination:

means for supplying a sequence of signals including data representative signals;

first means connected with the supply means for storing a first function of data representative signals;

second means connected with the supply means for storing a second function of aforesaid data representative signals;

recognition means connected with the supply means for monitoring additional signals interleaved in said sequence of signals and indicating the one of the first and second functions represented thereby; and gating means, connected with the first and second means and the recognition means, operable in accordance with the function indicated by the recognition means to access data from the one of the first and second means storing data in accordance with the corresponding function.

* * * * *

UNITED STATES PATENT AND TRADEMARK OFFICE

CERTIFICATE OF CORRECTION

PATENT NO. : 3,860,907

DATED : January 14, 1975

INVENTOR(S) : John W. Marshall

It is certified that error appears in the above-identified patent and that said Letters Patent are hereby corrected as shown below:

Column 6, line 37, "n+1)" should read --(n+1)--.
line 46, delete "$b_{n+}$,".

Column 7, line 46, delete "-" at end of line.

Column 12, line 24, delete "means;" and insert --a-- therefor.
line 27, "mans" should read --means--.

Column 14, line 4, "synchronization" should read --sequential--.

Signed and Sealed this

*twelfth* Day of *July 1977*

[SEAL]

*Attest:*

RUTH C. MASON
*Attesting Officer*

C. MARSHALL DANN
*Commissioner of Patents and Trademarks*